W. G. MOFFET.
MACHINE FOR TESTING CANS.
APPLICATION FILED JULY 5, 1911.
1,032,926.
Patented July 16, 1912.
3 SHEETS—SHEET 2.
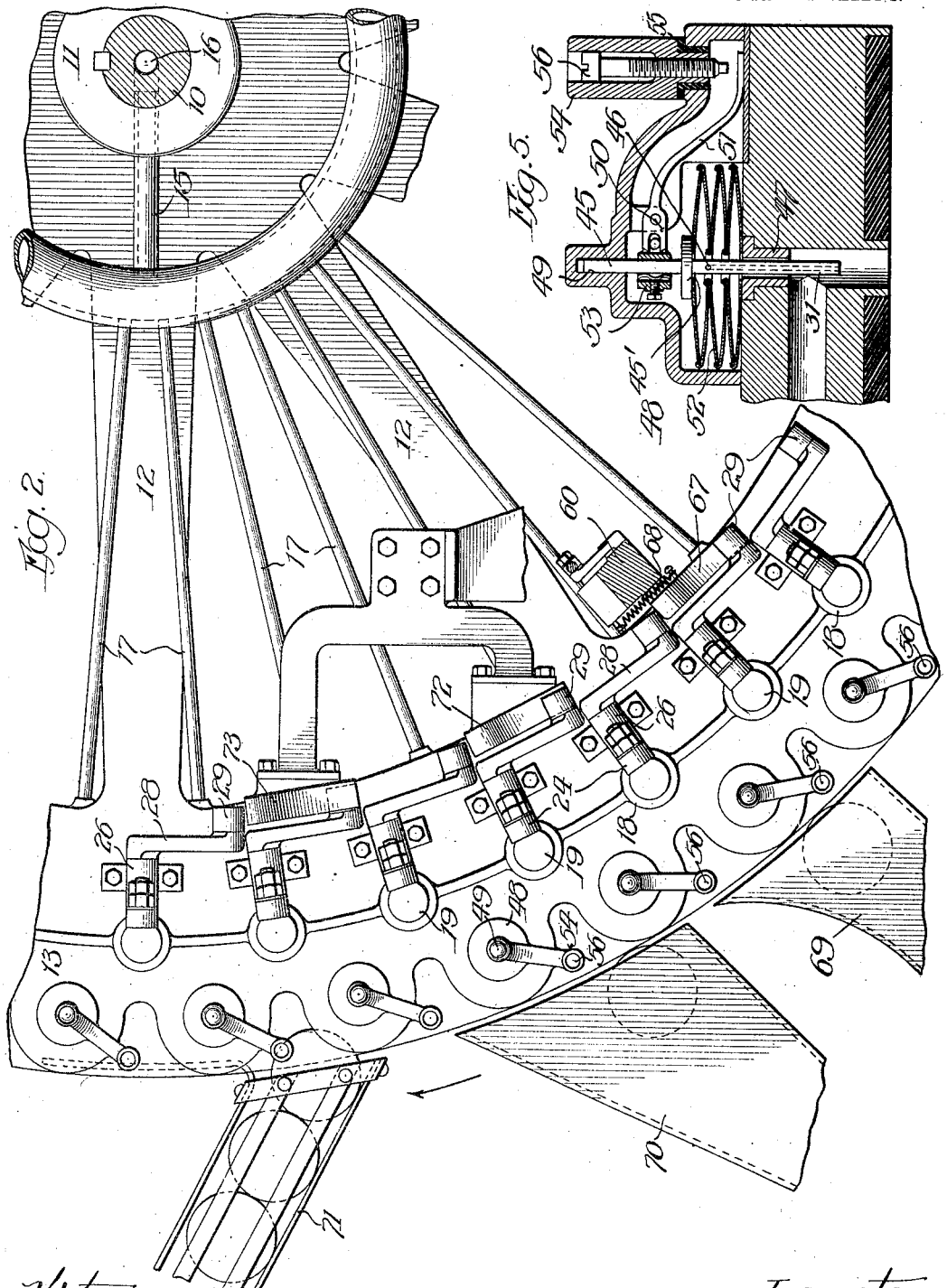

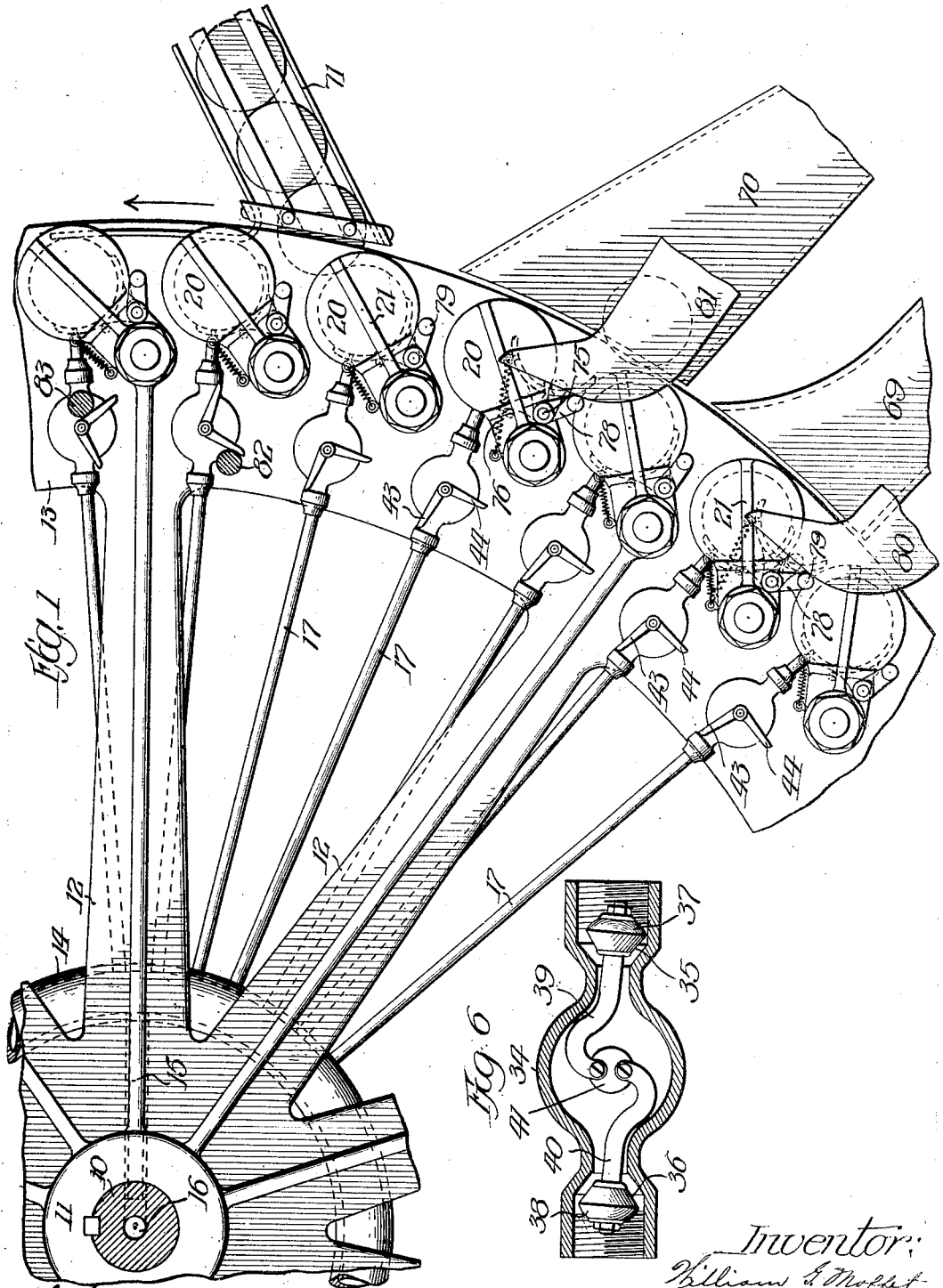

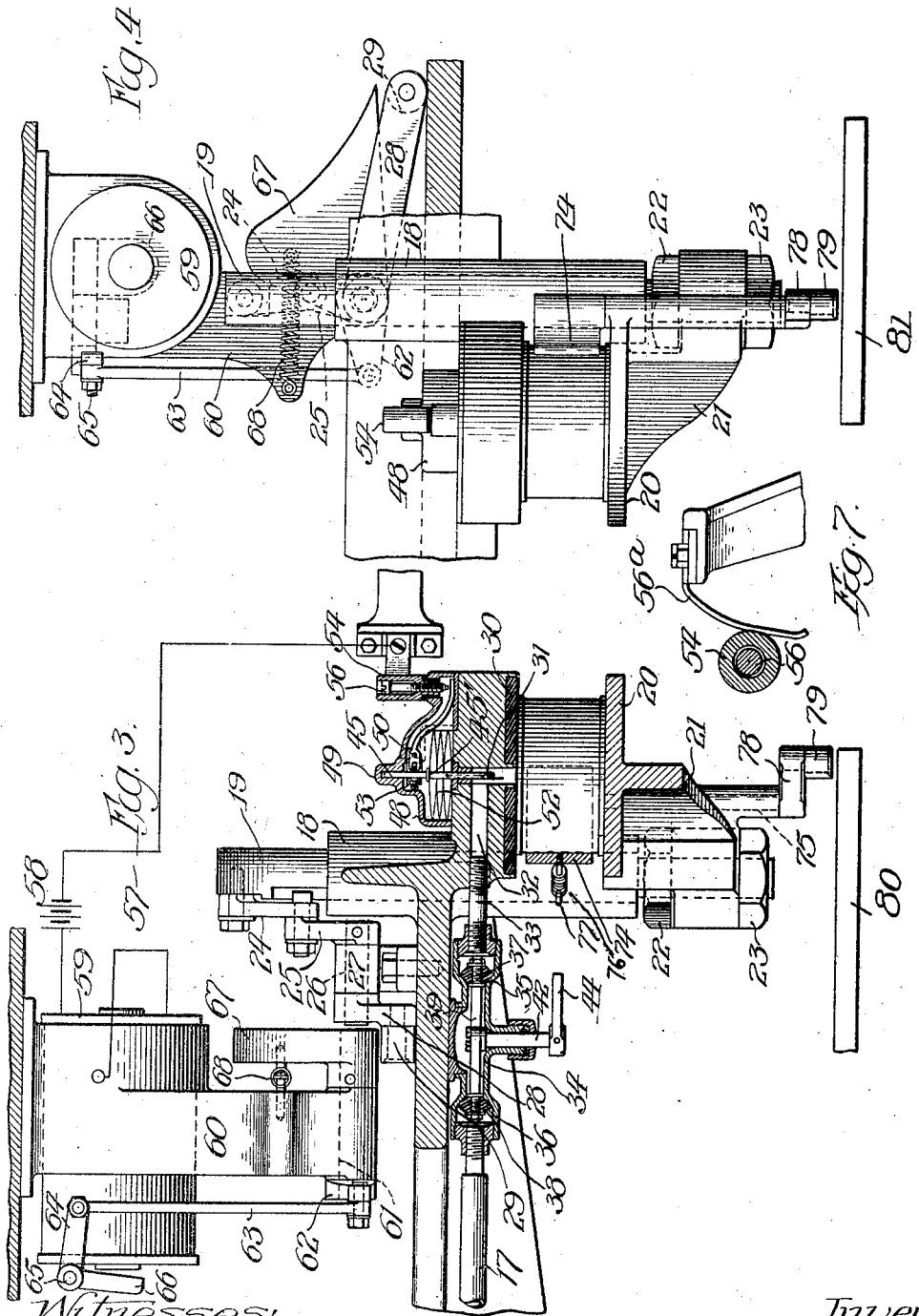

UNITED STATES PATENT OFFICE.

WILLIAM G. MOFFET, OF CHICAGO, ILLINOIS.

MACHINE FOR TESTING CANS.

1,032,926.

Specification of Letters Patent.

Patented July 16, 1912.

Application filed July 5, 1911. Serial No. 637,031.

*To all whom it may concern:*

Be it known that I, WILLIAM G. MOFFET, a citizen of the United States, residing at Chicago, in the county of Cook and State of Illinois, have invented certain new and useful Improvements in Machines for Testing Cans, of which the following is a specification.

My invention relates to can testing machines and has particular reference to a machine of this description which shall be simple in construction, efficient in operation and easily kept in repair.

In the construction and operation of can testing machines, both of the vacuum and the pressure types, many difficulties have been encountered. One difficulty is that of maintaining the vacuum or pressure without loss due to leakage; another disadvantage is the difficulty in securing efficient operation of such machines where the air pressure or vacuum is not constant; that is, a machine which may operate successfully at five pounds pressure may operate very indifferently at two pounds or ten pounds pressure. With these difficulties and disadvantages in view, I have produced a machine, an exemplification of which is shown and described herein, having the following advantages:

First. The air pressure or vacuum is delivered to the can testing terminals by such mechanism that but one stuffing box is necessary, this stuffing box being located on the main shaft where it may be kept tight and leak proof without unnecessary binding of the parts. This is a decided advantage over constructions wherein there is a stuffing box for each terminal or individual can testing combination of elements.

Second. The arrangement of mechanism in a can testing machine whereby there is absolutely efficient operation under variations in pressure or vacuum; the parts being sufficiently sensitive to operate at one ounce or ten pounds pressure with equal results. This is accomplished by means of novel diaphragms and electrical contacts, all as will be described later.

Third. To produce a novel valve which shall have a double seal to prevent possible leakage.

My invention will be more readily understood by reference to the accompanying drawings, wherein, Figure 1 is a side elevation of a fragment of a can carrying wheel showing my novel can testing machine: Fig. 2 is a view of the portion of the wheel shown in Fig. 1, looking from the opposite side; Fig. 3 is a detail partly in section, showing my novel detector mechanism; Fig. 4 is an elevation of the construction shown in Fig. 3; Fig. 5 is an enlarged detail of my novel diaphragms and electrical contacts operated thereby; Fig. 6 is a detail of the double valve operating means, and Fig. 7 is an enlarged fragmentary detail of the fixed contact and the contact associated with each unit.

Referring more particularly to the drawings it will be seen that I provide a shaft 10, which is mounted in suitable bearings in a frame work and connected to a suitable source of power, but as these features constitute no part of my invention, I have not illustrated the same. To the shaft 10 is keyed a large rotary element such as the wheel shown in the drawings, this wheel comprising a hub 11, radial spokes 12 and rim 13. Concentric with the shaft 10 and carried by the rotary element, I provide a tube or header 14, connected by means of a further tube 15, to a longitudinal passage 16, within the shaft 10. This passage 16 communicates by means of a suitably packed joint with a source of air pressure or vacuum, not shown.

Mounted on the rim 13 of the rotor is a relatively large number of can holding and testing devices. These devices are equally spaced around the rim and each unit is connected through a suitable tube 17 with the header 14. Inasmuch as each of the testing devices is a duplicate of the other, I shall proceed to a description of one only.

Transversely of the rim 13 and preferably integral therewith, I provide a tubular portion 18. Mounted for reciprocation within the tubular portion 18 I provide a shaft 19, this shaft having rigidly secured at one end a clamping member 20, this member being suitably strengthened by a rib 21. In order to provide for fine adjustment of the clamping member with reference to the can to be clamped, I provide limiting or adjusting nuts 22, 23, threaded on the shaft 19. Carried by the opposite end of the shaft is a short link 24, pivoted to a further link 25, fixed to a shaft 26, mounted in the bearing 27, secured to the rim 13. Also fixed to the shaft 26 is a short lever arm 28 having fixed to its free end a anti-friction roller 29. It will be seen that by means of the shaft and the various links referred to the clamping head 20, may be reciprocated as required. Carried within a circular depression in the rim 13 is a packing element 30, preferably composed of soft rubber. Against this the open end of the can to be treated is thrust by the clamping head 20. Transverse and radial passages 31, 32 respectively are provided in the rim 13, the passage 31 being preferably concentric with a can held between the clamps. Within the passage 32 I mount a short tube 33, which is in effect a continuation of the tube 17, heretofore referred to.

Interposed between the tubes 33 and 17 I mount my novel valve. This comprises a casing 34, having two oppositely disposed valve seats 35, 36. Valves 37, 38 are provided each valve being connected to short rods 39, 40 terminating in a rocker 41, fixed to a valve stem 42. Motion is transmitted to the valve stem through the two operating fingers 43, 44. Suitable packing glands are provided at the openings in the casing 34 in order to prevent air leakage. Within the passage 30 I mount a shaft 45, containing for at least a portion of its length a port 46. The outer end of the port 31 is closed by a suitable gland or packing 47. A casing 48 is secured to the rim 13 and contains a bearing 49 for the guidance of the end of the shaft 45. Pivoted on a lug 50, within the casing 48 is provided a rocker 51, adapted to make and break an electrical contact under the action of the diaphragms 52, concentrically mounted on the shaft 45. Connection of the rocker 51 to the shaft 45 is provided by means of the slip connection 53. The advantage derived from the use of a sliding instead of a positive connection will be apparent hereinafter. A collar 45′ is provided on the shaft 45 and to this collar is soldered the upper edge of the top diaphragm 52, whereas the lower wall of the bottom diaphragm is soldered to the rim 13 or to the member 47 as shown. It will be seen also that the diaphragms are soldered to each other at their middle portions and that the port 46 in the shaft 45 communicates with the interiors of the said diaphragm. I prefer to construct the said diaphragms of metal thus providing against the deterioration common in the use of rubber or rubber lined diaphragms. Also mounted within the casing 48 is a plug 54, properly insulated from the casing by means of the insulating packing 55 and containing a screw-threaded electrical contact 56. A contact piece 56ª is secured to a portion of the frame work at a point just opposite the imperfect can chute 69, that is, it is so positioned that an electrical impulse will cause the discharge of an imperfect can at this point as will be later described. An electrical conduit 57 connects the contact 56 with a magnet or solenoid 59, there being a battery 58 interposed in the circuit. The negative or return connection may be through the machine. The magnet 59 is carried in a bracket 60 secured to the frame work of the machine, the same bracket carrying at its outer end a shaft 61 to one end of which is secured a short lever arm 62. A link 63 connects the arm 62 to a rocker 64, pivoted at 65 to a portion of the magnet. One end of the rocker constitutes an armature 66. Secured to the other end of the shaft 61 is a cam member 67 normally held in raised position, as shown in Fig. 4, by means of a coil spring 68. It will be understood that the magnet and cam 67 are adapted to discharge cans in which a leak has been found and that there is but one magnet and cam for each complete wheel. This magnet is located as shown in Fig. 2, just opposite the imperfect can chute 69. A perfect can chute 70 is provided above the imperfect can chute and a conveyer or gravity chute 71 provides for the entrance of untested cans to the machine.

Mounted on the frame work of the machine at a point above the cam 67 are two other cams 72, 73, arranged respectively for discharging good cans and clamping cans in the machine. The cam 72 is rigid with the frame and corresponds in shape to the cam 67. Any cans which pass the test and are not discharged by the electrical detector heretofore described will surely be released when the rocker arm 28 with its anti-friction roller 29 contacts the cam 72. The cam 73 is reversely shaped and closes the head 20 upon a can, the parts being held in closed position by reason of the fact that the short arms 24, 25, are thrown past center as shown in Fig. 4. As shown in Fig. 3, a can has been clamped between the clamping head 20 and the packing 30.

In order to provide effective means for discharging the cans when released by the clamping head, I prefer to provide a rockable cradle in which the cans are seated. This cradle is composed of a semi-circular portion 74, pivoted on a shaft 75, the cradle being normally held in position to receive a can by means of a coil spring 76, secured at one end to the cradle and at the other end 77 to the tubular portion 18 of the wheel. Rigid with the shaft 75 I provide a short arm 78 having an anti-friction roller 79 thereon. The shaft 75 is secured as shown in Fig. 3, in bearings provided in the head 20 and is adapted to be shifted longitudinally thereby. It will be seen therefore that on the shifting of the head to release the can, the roller 79 will be projected into the path of one of two cams 80, 81, secured to a portion of the frame work in the machine and the cradle will be rocked thus throwing the can into the proper chute.

In order to provide for the shifting of the air admission valve by means of the two arms, 43, 44, on the stem thereof, I provide stops 82, 83, on the frame work of the machine, so located that the valve will be shifted at the proper point. In Fig. 1 the arm 43 has contacted the stop 82 and the valve has been opened. In the unit above the one thus acted upon the arm 44 is about to contact the stop 83 and close the valve.

The operation of my can testing machine is as follows: Assuming the wheel to be in motion and without having previously been supplied with cans to be tested, a quantity of previously formed cans are supplied to the chute 71. These descend and the first thereof is seated in the cradle 74 of one of the units, the head 20 being retracted to permit the entrance of the can. With the continued rotation of the wheel the testing unit containing the can referred to is elevated until the roller 29, on the arm 28, contacts the under side of cam 73 and causes the shifting of the head 20 and the clamping of the can against the packing 30. Continued movement causes the arm 43 to contact the stop 82 and shift the double valve whereby air under pressure is admitted to the interior of the can. This causes the inflation of the diaphragms 52 and the shifting of the contact arm 51, thus breaking any electrical contact theretofore made. The air pressure remains in the can until, after continued rotation, the arm 44 strikes the stop 83 and causes the closing of the double valve, thus shutting off the air supply. The wheel continues its rotation and if during its revolution air should escape through a leak in the can, the diaphragms 52 will contract, carrying the shaft 45 with them and likewise the arm 51 until the arm touches the contact 56; then when the proper point has been reached, that is, opposite the imperfect can chute, the circuit will be closed thus causing the shifting of the armature 56 and likewise of the cam 67. The lower point of the cam 67 will then project underneath the roller 29 and cause the elevation of the same and the retraction of the head 20, together with the arm 78 and its roller 79. Thus the roller 79 will contact the cam 80 and cause the discharge of the defective can into the chute 69. If, however, no leaks are discovered in the can, no action will take place until the roller 29 contacts the permanent cam 72 and causes the shifting of the head and roller 79 with the consequent discharge of the can into the perfect can chute 70. A complete cycle of operations has been described but it will be understood that during the operations heretofore described further cans have been received in the can cradles and the operation is made continuous.

It will be seen that by reason of the slip-joint between the shaft 45 and the connection 53, if a very high pressure is received from the source of supply, the diaphragms may expand and the shaft 45 be projected to its limit. However, the movement of the contact arm 51 is very slight as after it is shifted to its extent of movement the shaft will slide through the connection 53. However, on the return movement it will be seen that the very slightest retraction of the shaft will cause the shifting of the arm and consequent completion of the electrical circuit. This construction is specifically claimed in my co-pending application Serial No. 637,032.

By reason of the double valve heretofore described, there is no possible escape of air from either way, that is, from the air confined in the can or from the pressure exterior to the testing unit.

It will be understood that although I have described my testing mechanism as particularly adapted for use under air pressure, it may be used with equal facility in connection with vacuum. In that instance, the arrangement of the diaphragms and contact pieces would be reversed.

I claim:

1. A can testing machine comprising, in combination, a rotatable conveyer, a plurality of can testing units carried by said conveyer, each said unit including a clamping head carried by a shaft, a toggle joint for shifting said shaft and holding said head in clamping position, a pivotally mounted can receiving cradle associated with said clamping head, detector mechanism, means for supplying fluid pressure to the interior of a can held by said clamping heads, and means for shifting said clamping heads and discharging imperfect cans from said conveyer, said means including an electrical magnet and an electrical contact, substantially as described.

2. Can testing mechanism comprising, in combination, a conveyer, a plurality of can clamping and testing units carried by said conveyer, a fluid supply connection to each of said units, an electric motor; a plurality of cams contiguous to said conveyer, one of said cams being adapted to be shifted by said electric motor, a diaphragm associated with each testing unit, shiftable contacts adapted for actuation by said diaphragms, an electrical circuit having a source of electrical energy interposed therein and connected with said electric motor whereby upon the closing of said electrical circuit an imperfect can is unclamped and discharged from said conveyer, substantially as described.

3. Can testing mechanism comprising, in combination, a conveyer, a plurality of can clamping and testing units carried by said conveyer, said clamping means including a toggle joint, an electric motor, a plurality of cams mounted exteriorly of said conveyer, one of said cams being adapted to be shifted by said motor, said can clamping and testing units each including a shaft, said shaft carrying a clamping head adapted to be actuated and held in clamping position by the toggle joint, fluid supply connections to each unit, diaphragms, means connecting the interior of said diaphragms with said fluid supply connection, a pivoted contact piece mounted for actuation by said diaphragms, and connections between said contact piece and said motor whereby one of the cams is shifted to cause the unclamping of a can carried by said conveyer, substantially as described.

4. Can testing mechanism comprising, in combination, a conveyer, a plurality of can clamping and testing units carried by said conveyer, said clamping means including a toggle joint, a plurality of cams mounted exteriorly of said conveyer, one of said cams being adapted to be shifted by an electric motor, said can clamping and testing units each including a shaft, said shaft carrying a clamping head adapted to be actuated and held in clamping position by the toggle joint, fluid supply connections to each unit, diaphragms, means connecting the interior of said diaphragms with said fluid supply connection, a pivotally mounted contact piece having a flexible connection to said diaphragms, and connections between said contact piece and said electric motor whereby one of the cams is actuated to cause the unclamping of a can carried by said conveyer, substantially as described.

5. A can testing machine comprising, in combination, a traveling element having a plurality of can testing units associated therewith, a shaft traveling with said traveling element, said shaft containing a duct, a header carried by said traveling element, tubes connecting each can testing unit with said header, a valve in each tube, said valve having a double seal, and a tube connecting said header with the duct in said shaft, substantially as described.

6. A can testing machine comprising, in combination, a traveling element having a plurality of can testing units associated therewith, a shaft traveling with said traveling element, said shaft containing a duct, a header carried by said traveling element, tubes connecting each can testing unit with said header, a double valve in each tube, said valve having reversely positioned seats, and a tube connecting said header with the duct in said shaft, substantially as described.

7. A can testing machine comprising, in combination, a traveling element having a plurality of can testing units associated therewith, a fluid supply connection to each of said units, a pair of reversely positioned valves and a valve stem in said connection, both said valves being operable from said stem, substantially as described.

WILLIAM G. MOFFET.

Witnesses:
JESSE W. NICHOLS,
ABRAM B. STRATTON.